US012759495B2

(12) United States Patent
Morita et al.

(10) Patent No.: US 12,759,495 B2

(45) Date of Patent: Oct. 13, 2026

(54) VEHICULAR SHOCK ABSORBER

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Daizo Morita, Aichi-ken (JP); Katsuhiko Usami, Aichi-ken (JP); Shogo Kojima, Aichi-ken (JP); Yuta Sugiura, Aichi-ken (JP); Takahiro Sugiyama, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 455 days.

(21) Appl. No.: 18/503,332

(22) Filed: Nov. 7, 2023

(65) Prior Publication Data

US 2024/0149820 A1 May 9, 2024

(30) Foreign Application Priority Data

Nov. 9, 2022 (JP) ................................ 2022-179240

(51) Int. Cl.
*B60R 21/04* (2006.01)

(52) U.S. Cl.
CPC ................................ *B60R 21/0428* (2013.01)

(58) Field of Classification Search
CPC .................................................. B60R 21/0428

(Continued)

(56) References Cited

U.S. PATENT DOCUMENTS 8,444,209 B2 5/2013 Kato et al.
10,336,276 B2 * 7/2019 Tallapragada ...... B60R 21/0428

(Continued)

FOREIGN PATENT DOCUMENTS

DE 102013001763 B4 * 5/2026 ................ F16F 7/12
JP 2007-055549 3/2007

(Continued)

OTHER PUBLICATIONS

Japan, Notice of Reasons for Refusal received in JP Application No. 2022-179240, dated Jan. 27, 2026, and English language translation thereof.

(Continued)

*Primary Examiner* — Hilary L Gutman

(74) *Attorney, Agent, or Firm* — GREENBLUM & BERNSTEIN, P.L.C.

(57) ABSTRACT

A vehicular shock absorber to be mounted on a vehicular exterior side with respect to a vehicular interior component includes a low rigidity portion, a high rigidity portion having higher rigidity than the low rigidity portion, and a first connection portion. The low rigidity portion includes a first plate portion that has a first vehicular interior side surface, and a first mount portion that extends from the first vehicular interior side surface and is to be fixed to the vehicular interior component. The high rigidity portion includes a second plate portion that has a second vehicular interior side surface, and a second mount portion that extends from the second vehicular interior side surface and is to be fixed to the vehicular interior component. The first connection portion extends between and connects the first plate portion of the low rigidity portion and the second plate portion of the high rigidity portion.

15 Claims, 5 Drawing Sheets

(58) Field of Classification Search
USPC ........................................................ 296/146.7
See application file for complete search history.

(56) References Cited

U.S. PATENT DOCUMENTS

| | | | | |
|---|---|---|---|---|
| 2011/0221230 | A1 | 9/2011 | Kato et al. | |
| 2014/0265429 | A1 * | 9/2014 | Deng | B60J 5/0461 296/146.7 |

FOREIGN PATENT DOCUMENTS

| | | | | |
|---|---|---|---|---|
| JP | 2010-13016 | | 1/2010 | |
| JP | 2011-189844 | | 9/2011 | |
| JP | 2015-54635 | | 3/2015 | |
| JP | 2021-191655 | | 12/2021 | |
| JP | 7851360 | B2 * | 4/2026 | B60R 13/0243 |

OTHER PUBLICATIONS

Japan, Notice of Reasons for Refusal received in JP Application No. 2022-179240, mail date of Apr. 2, 2026, and English translation.

* cited by examiner

100

VEHICULAR SHOCK ABSORBER

CROSS REFERENCE TO RELATED APPLICATION

This application claims priority from Japanese Patent Application No. 2022-179240 filed on Nov. 9, 2022. The entire contents of the priority application are incorporated herein by reference.

TECHNICAL FIELD

The present technology described herein relates to a vehicular shock absorber.

BACKGROUND

A vehicular interior component (a door trim body) includes an impact area that is likely to be in contact with a passenger's shoulder or hip. A vehicular shock absorber (a shock absorber) is arranged on the impact area that is likely to be in contact with the passenger's hip has been known.

SUMMARY

In mounting multiple vehicular shock absorbers on several sections of the vehicular interior component, the number of the shock absorbers increases and the number of mounting members for mounting the shock absorbers on the vehicular interior component also increases. This increases a cost. The vehicular shock absorbers need to have different load bearing properties to be used for different protection targets such as the occupant's hip and thigh. The vehicular shock absorbers are desirably configured to effectively absorb shock that is applied to the respective parts of the occupant.

An object of the present technology described herein is to provide a vehicular shock absorber with which a cost can be reduced. An object of the present technology described herein is to provide a vehicular shock absorber that can effectively absorb shock.

A vehicular shock absorber according to the technology described herein is to be mounted on a vehicular exterior side with respect to a vehicular interior component. The vehicular shock absorber includes a low rigidity portion, a high rigidity portion that has rigidity higher than rigidity of the low rigidity portion, and a first connection portion. The low rigidity portion includes a first plate portion that has a first vehicular interior side surface facing a vehicular interior side, and a first mount portion that extends from the first vehicular interior side surface toward a vehicular interior side and is to be fixed to the vehicular interior component. The high rigidity portion includes a second plate portion that has a second vehicular interior side surface facing the vehicular interior side, and a second mount portion that extends from the second vehicular interior side surface toward the vehicular interior side and is to be fixed to the vehicular interior component. The first connection portion extends between and connects the first plate portion of the low rigidity portion and the second plate portion of the high rigidity portion.

DETAILED DESCRIPTION

A door trim 1 (a vehicular interior component) that is to be mounted on a door of an automobile (a vehicle) and an energy absorption (EA) member 100 (a vehicular shock absorber) that is to be mounted on a vehicular exterior side of the door trim 1 will be described with reference to FIGS. 1 to 5. In each drawing, the arrows of F and R represent a vehicular front side and a vehicular rear side, respectively, and the arrows of U and D represent an upper side and a lower side, respectively, and the arrows IN and OUT represent a vehicular interior side and a vehicular exterior side, respectively.

Figure 1:
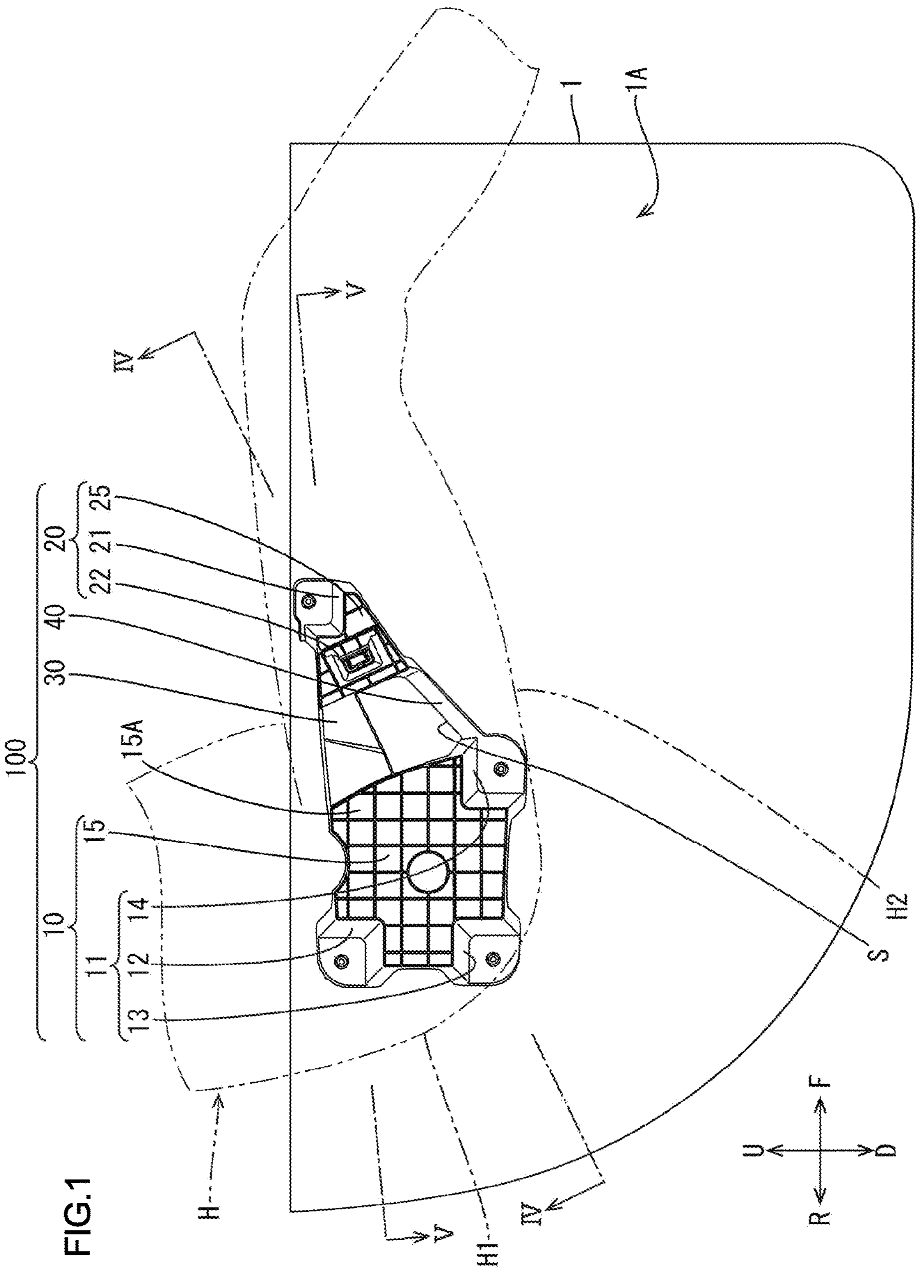
FIG. 1 is a side view of a door trim seen from a vehicular exterior side.
Figure 2:
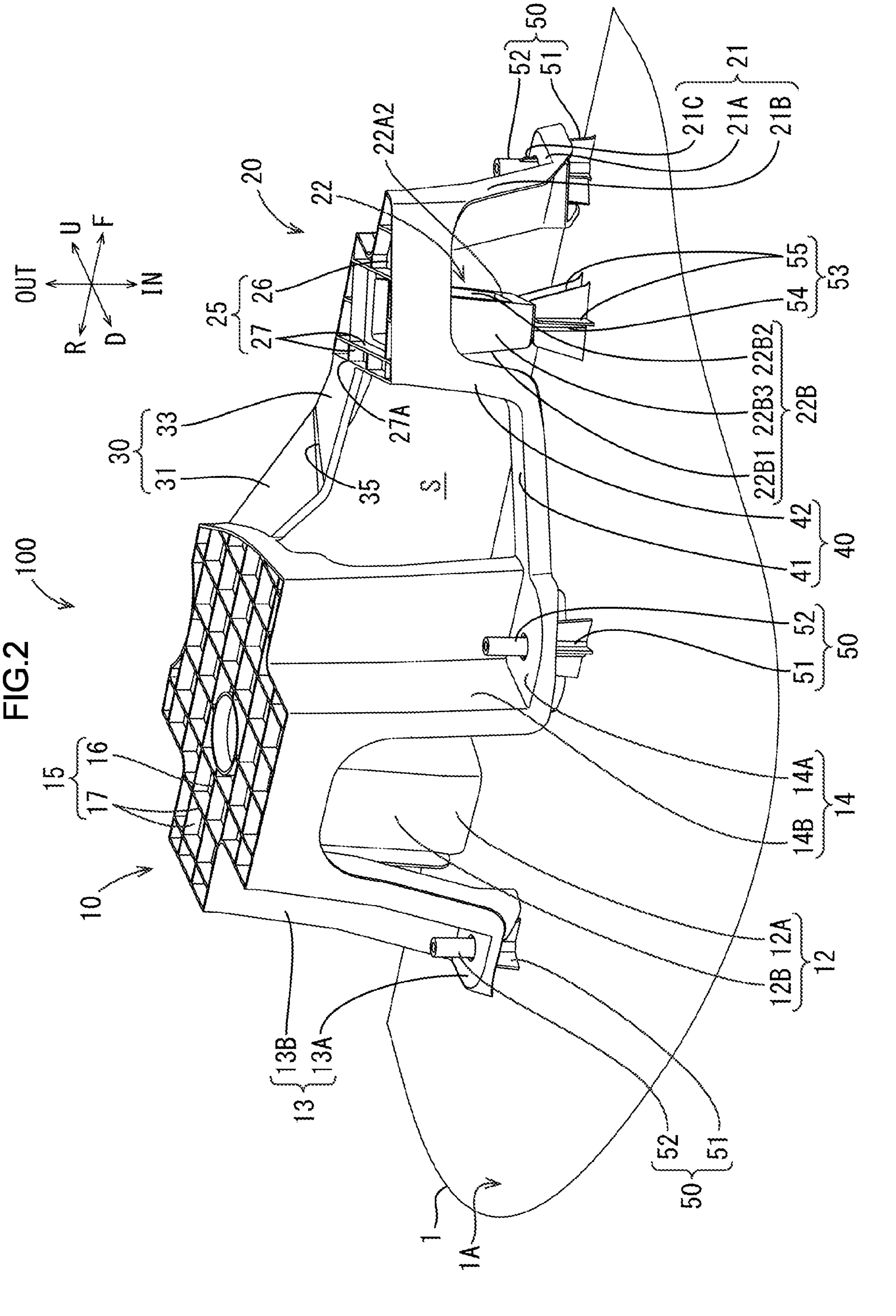
FIG. 2 is a perspective view illustrating the door trim and an EA member.

As illustrated in FIGS. 1 and 2, the door trim 1 is a plate member that extends in a vehicular front-rear direction and a vehicular upper-bottom direction. In FIG. 1, a part of an occupant H who is seated in a seat of a vehicle is illustrated with a two-dot chain line. A thigh H2 of the occupant H extends frontward from a hip H1. The energy absorption (EA) member 100 (a vehicular shock absorber) is mounted on a rear surface 1A (a vehicular exterior side surface) of the door trim 1 that faces the vehicular exterior side. The EA member 100 can absorb energy when a vehicle is crushed from the side (a side collision occurs).

The EA member 100 is a member made of resin such as hard urethane. The EA member 100 includes a low rigidity portion 10, a high rigidity portion 20 that has higher rigidity than the low rigidity portion 10, a first connection portion 30 and a second connection portion 40 that connect the low rigidity portion 10 and the high rigidity portion 20. The low rigidity portion 10 is disposed corresponding to the hip H1 of the occupant H and on the vehicular exterior side with respect to the hip H1. The high rigidity portion 20 is disposed corresponding to the thigh H2 of the occupant H and on the vehicular exterior side with respect to the thigh H2. The high rigidity portion 20 is disposed on a front side with respect to the low rigidity portion 10. The first connection portion 30 and the second connection portion 40 extend from the low rigidity portion 10 to the high rigidity portion 20. The EV member 100 has a hole S that is defined by the low rigidity portion 10, the high rigidity portion 20, the first connection portion 30, and the second connection portion 40. The hole S is through in the upper-bottom direction.

Figure 4:
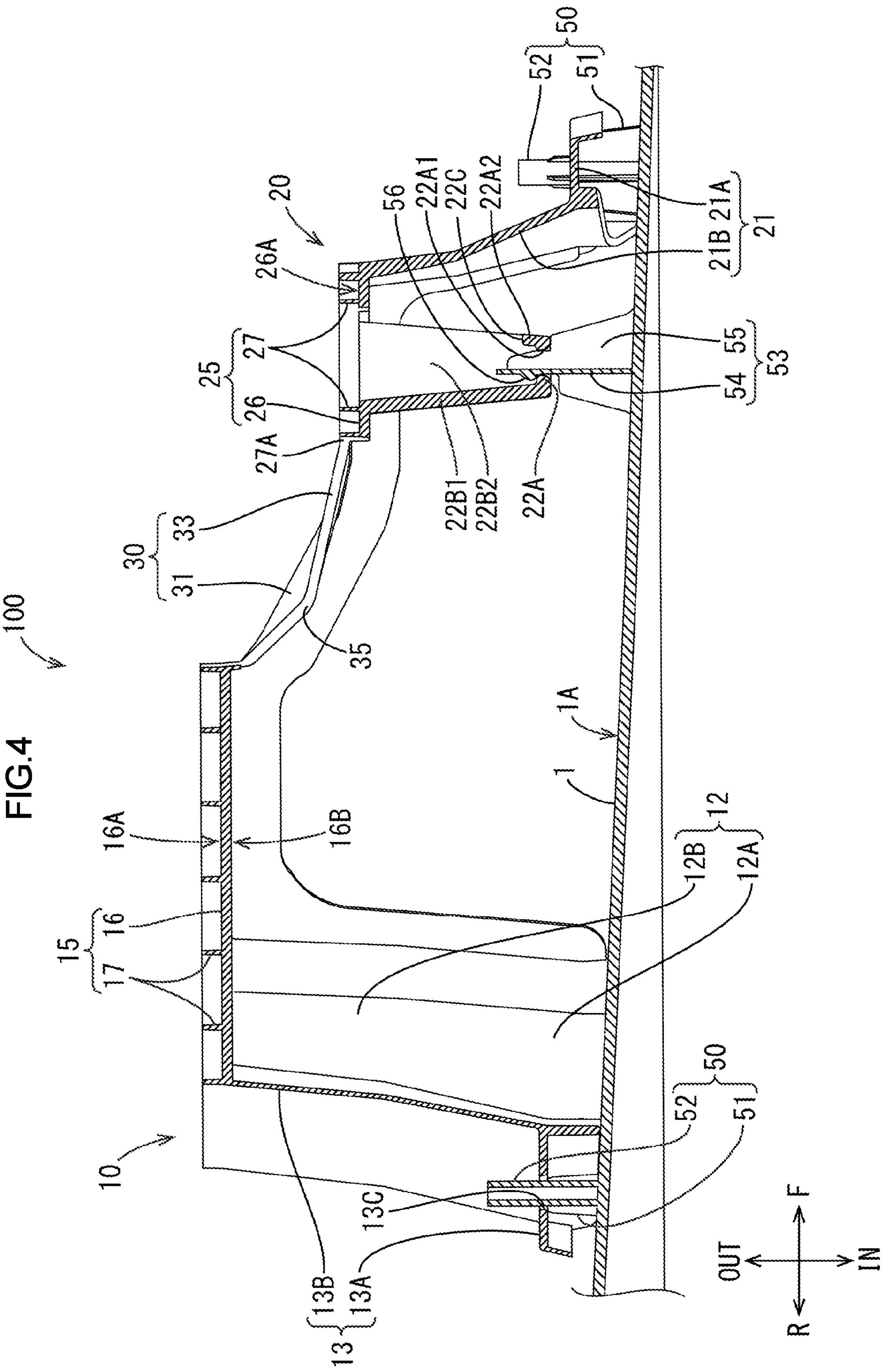
FIG. 4 is a cross-sectional view of the door trim and the EA member taken along line IV-IV in FIG. 1.

The low rigidity portion 10 includes a first mount portion 11 that is fixed to the door trim 1 and a first plate portion 15 that has a surface 16A facing the vehicular exterior side (refer to FIG. 4). The first plate portion 15 is on the vehicular exterior side with respect to the first mount portion 11. The first mount portion 11 extends from a vehicular interior side surface 16B of the first plate portion 15 toward a vehicular interior side. As illustrated in FIG. 1, the first mount portion 11 includes a first fix portion 12, a second fix portion 13, and a third fix portion 14. The first fix portion 12 is on a rear upper edge portion of the first plate portion 15. The second fix portion 13 is on a rear lower edge portion of the first plate portion 15. The third fix portion 14 is on a front lower edge portion of the first plate portion 15. No mount mechanism such as the first mount portion 11 is provided on a front upper portion 15A of the first plate portion 15.

The first fix portion 12, the second fix portion 13, and the third fix portion 14 are coupled to bosses 50, respectively. The bosses 50 project from the rear surface 1A of the door trim 1 toward the vehicular exterior side surface. As illustrated in FIGS. 2 and 4, the boss 50 includes a boss body 52 and boss plate portions 51. The boss body 52 has a tubular shape extending in a vehicular interior-exterior direction. The plate portions 51 have a plate shape and extending radially from the boss body 52 along the rear surface 1A.

As illustrated in FIG. 2, the second fix portion 13 includes a base 13A and an extending portion 13B. The extending portion 13B extends from the rear lower edge portion of the first plate portion 15 toward the vehicular interior side. The base 13A is at an extending end of the extending portion 13B and includes a hole 13C that is through the base 13A in the vehicular interior-exterior direction. The extending portion 13B has an L-shaped cross section taken along a surface extending in the upper-bottom direction and the front-rear direction. The extending portion 13B has an L-shaped cross section taken along the rear surface 1A of the door trim 1. With the boss body 52 being inserted in the hole 13C and the base 13A being close to or contacted with the plate portions 51, the boss body 52 is subjected to the ultrasonic welding and the second fix portion 13 is fixed to the door trim 1 via the boss 50. This process is defined as final mounting. The first fix portion 12 and the third fix portion 14 has a configuration similar to that of the second fix portion 13. The first fix portion 12, the third fix portion 14, and a second mount portion 21, which will be described later, are fixed to the door trim 1 via the bosses 50 similarly to the second fix portion 13.

For instance, the first fix portion 12 includes a base 12A and an extending portion 12B. The third fix portion 14 includes a base 14A and an extending portion 14B. The extending portions 12B, 14B, respectively, extend from the rear upper edge portion and the front lower portion of the first plate portion 15 toward the vehicular interior side. The bases 12A, 14A are at extending ends of the extending portions 12B, 14B, respectively, and include holes that are through the bases 12A, 14A in the vehicular interior-exterior direction. The extending portions 12B, 14B have an L-shaped cross section taken along a surface extending in the upper-bottom direction and the front-rear direction. The extending portions 12B, 14B have an L-shaped cross section taken along the rear surface 1A of the door trim 1. Each drawing illustrates the boss bodies 52 before the ultrasonic welding.

The first plate portion 15 includes a first body portion 16 and ribs 17. The first body portion 16 is connected to the first mount portion 11 and has a plate shape extending in the front-rear direction and the upper-bottom direction. The ribs 17 project from a vehicular exterior side surface 16A of the first body portion 16 and have a plate shape. The ribs 17 extend to be formed in a grid seen from the vehicular exterior side. The first plate portion 15 is disposed corresponding to the hip H1 of the occupant H and on the vehicular exterior side with respect to the hip H1. The first plate portion 15 receives force when a side collision occurs and the door panel hits the first plate portion 15.

The high rigidity portion 20 includes the second mount portion 21, a third mount portion 22, and a second plate portion 25. The second mount portion 21 and the third mount portion 22 are fixed to the door trim 1. The second plate portion 25 has a surface 26A facing the vehicular exterior side (refer to FIG. 4) and is on the vehicular exterior side with respect to the second mount portion 21. The second mount portion 21 extends from a vehicular interior side surface of the second plate portion 25 toward the vehicular interior side. As illustrated in FIG. 2, the second mount portion 21 includes a base 21A and an extending portion 21B. The extending portion 21B extends from a front edge portion of the second plate portion 25 toward the vehicular interior side. The base 21A is at an extending end of the extending portion 21B and includes a hole 21C that is through the base 21A in the vehicular interior-exterior direction. The extending portion 21B has an L-shaped cross section taken along a surface extending in the upper-bottom direction and the front-rear direction. The extending portion 21B has an L-shaped cross section that is taken along the rear surface 1A of the door trim 1. With the boss body 52 being inserted in the hole 21C and the base 21A being close to or contacted with the plate portions 51, the boss body 52 is subjected to the ultrasonic welding and the second mount portion 21 is fixed to the door trim 1 via the boss 50. This process is defined as the final mounting.

As illustrated in FIGS. 1 and 2, the third mount portion 22 extends from a middle portion of the second plate portion 25 toward the vehicular interior side. The mounting structure of the third mount portion 22 with respect to the door trim 1 differs from that of the first mount portion 11 and the second mount portion 21 with respect to the door trim 1 with using the bosses 50. As illustrated in FIGS. 2 and 4, the third mount portion 22 is fixed to the door trim 1 with a stopper projection 53 that projects from the rear surface 1A of the door trim 1 toward the vehicular exterior side (mounting structure with projection fitting). The stopper projection 53 includes, a stopper body 54, stopper ribs 55, and a projection 56. The stopper body 54 is a plate member extending in the vehicular interior-exterior direction. The projection 56 is projects from the stopper body 54. The stopper ribs 55 extend from the stopper body 54 along the rear surface 1A of the door trim 1 and support the sopper body 54.

As illustrated in FIGS. 1, 2 and 4, the third mount portion 22 includes a base 22A and an extending portion 22B that includes a first extending portion 22B1, a second extending portion 22B2, and a third extending portion 22B3. The first extending portion 22B1, the second extending portion 22B2, and the third extending portion 22B3 extend from the second plate portion 25 toward the vehicular interior side. The base 22A is at extending ends of the first extending portion 22B1, the second extending portion 22B2, and the third extending portion 22B3 and includes a stopper hole 22A1 that is through the base 22A in the vehicular interior-exterior direction. The third mount portion 22 further includes a front edge wall 22A2 extending from a front edge of the base 22A toward the vehicular exterior side. The extending portion 22B including the first extending portion 22B1, the second extending portion 22B2, and the third extending portion 22B3 has a C-shaped cross section taken along a surface extending in the upper-bottom direction and the front-rear direction. The third mount portion 22 has an opening 22C that opens frontward. With the stopper body 54 being inserted in the stopper hole 22A1 and the projection 56 being stopped by a hole edge of the stopper hole 22A1, the base 22A is close to or contacted with the stopper ribs 55 and mated with the stopper projection 53. Thus, the third mount portion 22 is fixed to the door trim 1 via the stopper projection 53. This process is defined as a provisional mounting. After the provisional mounting, the final mounting is performed.

As illustrated in FIGS. 2 and 4, the second plate portion 25 includes a second body portion 26 and ribs 27. The second body portion 26 is continuous to the second mount portion 21 and the third mount portion 22 and has a plate shape extending in the front-rear direction and the upper-bottom direction. The second mount portion 21 and the third mount portion 22 extend vehicular interior side from the second body portion 26. The ribs 27 project from a vehicular exterior side surface 26A of the second body portion 26 and have a plate shape. The ribs 27 extend to be formed in a grid seen from the vehicular exterior side. As illustrated in FIGS. 1 to 4, the second plate portion 25 is disposed on an upper front side with respect to the first plate portion 15. The second plate portion 25 is on the vehicular interior side than the first plate portion 15. The second plate portion 25 is closer to the door trim 1 than the first plate portion 15 with respect to the vehicular interior-exterior direction. Namely, the length of the second mount portion 21 is smaller than the length of the first mount portion 11. An area of the vehicular exterior side surface 26A of the second plate portion 25 is smaller than an area of the vehicular exterior side surface 16A of the first plate portion 15. The vehicular exterior side surface 26A of the second plate portion 25 is disposed on the vehicular interior side than the vehicular exterior side surface 16A of the first plate portion 15. The second plate portion 25 is disposed corresponding to the thigh H2 of the occupant H and on the vehicular exterior side with respect to the thigh H2. The second plate portion 25 receives force when a side collision occurs and the door panel hits the second plate portion 25.

The high rigidity portion 20 may have any configuration and material that can provide higher rigidity than the low rigidity portion 10. For example, the high rigidity portion 20 has higher rigidity than the low rigidity portion 10 with the following structures. The high rigidity portion 20 may include the third mount portion 22. The thickness of the high rigidity portion 20 may be greater than that of the low rigidity portion 10. Specifically, the thicknesses of the second mount portion 21 and the second plate portion 25 may be greater than the thicknesses of the first mount portion 11 and the first plate portion 15. The area of the vehicular exterior side surface 26A of the second plate portion 25 may be smaller than the area of the vehicular exterior side surface 16A of the first plate portion 15. The height of the second plate portion 25 may be smaller than the height of the first plate portion 15, that is, the distance from the door trim 1 to the second plate portion 25 is smaller than the distance from the door trim 1 to the first plate portion 15.

As illustrated in FIGS. 2 to 5, the first connection portion 30 extends from the first plate portion 15 to the second plate portion 25 and connects the first plate portion 15 and the second plate portion 25. The first connection portion 30 includes a low rigidity plate portion 31 and a high rigidity plate portion 33 that has higher rigidity than the low rigidity plate portion 31. The high rigidity plate portion 33 is closer to the high rigidity portion 20 and the thigh H2 than the low rigidity plate portion 31 is and on the front side with respect to the low rigidity plate portion 31. The low rigidity plate portion 31 and the high rigidity plate portion 33 are continuous to each other and configured as the first connection portion 30 and the first connection portion 30 is a plate member that is bent at a border section 35 to protrude toward the vehicular interior side. By changing the thickness of the first connection portion 30 and changing the length of the first connection portion 30 measured in the front-rear direction as appropriate, the rigidity of the low rigidity portion 10, the rigidity of the high rigidity portion 20, and the rigidity of the whole EA member 100 can be altered. The length of the first connection portion 30 measured in the front-rear direction is a distance between the low rigidity portion 10 and the high rigidity portion 20.

Figure 3:
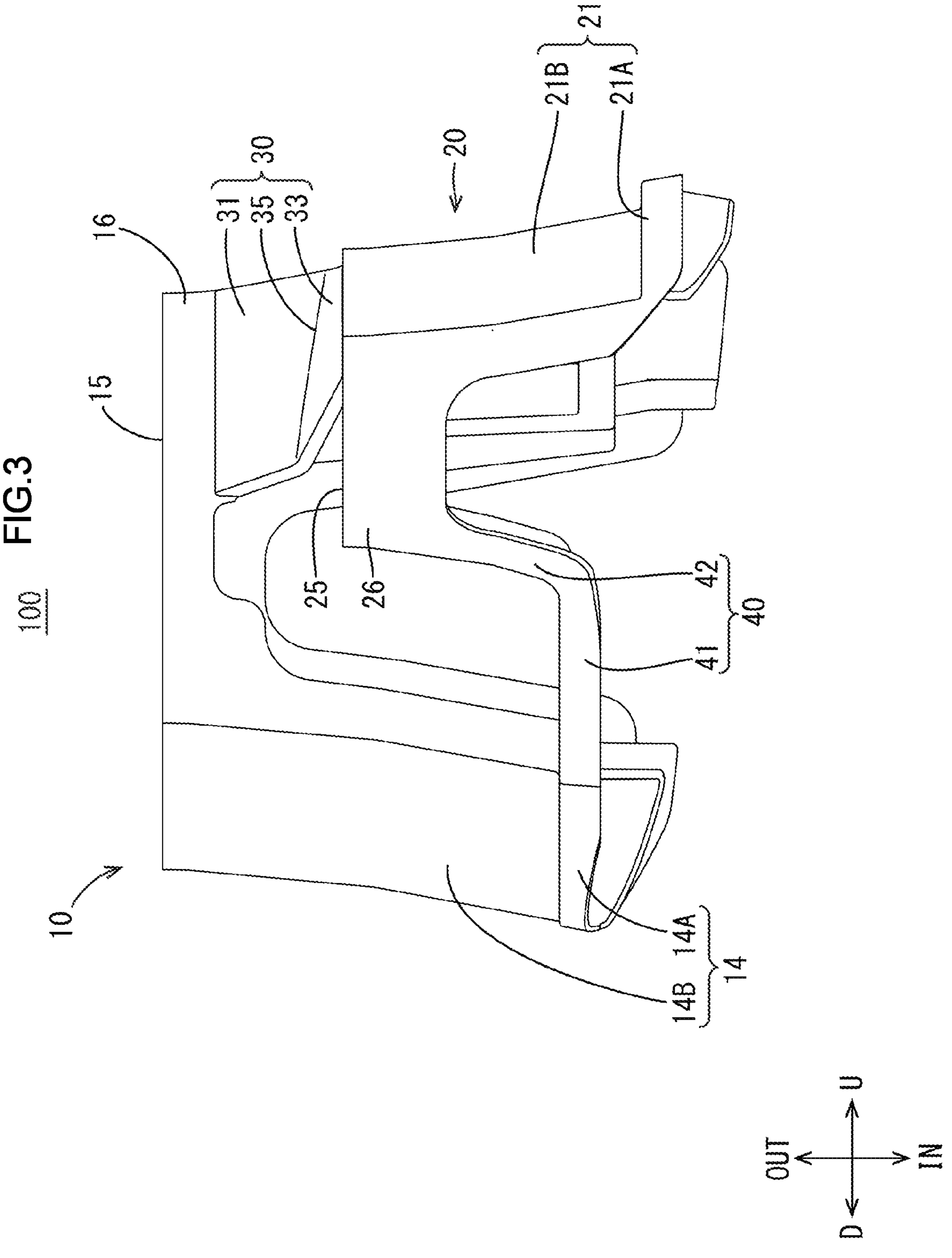
FIG. 3 is a front view of the EA member.
Figure 5:
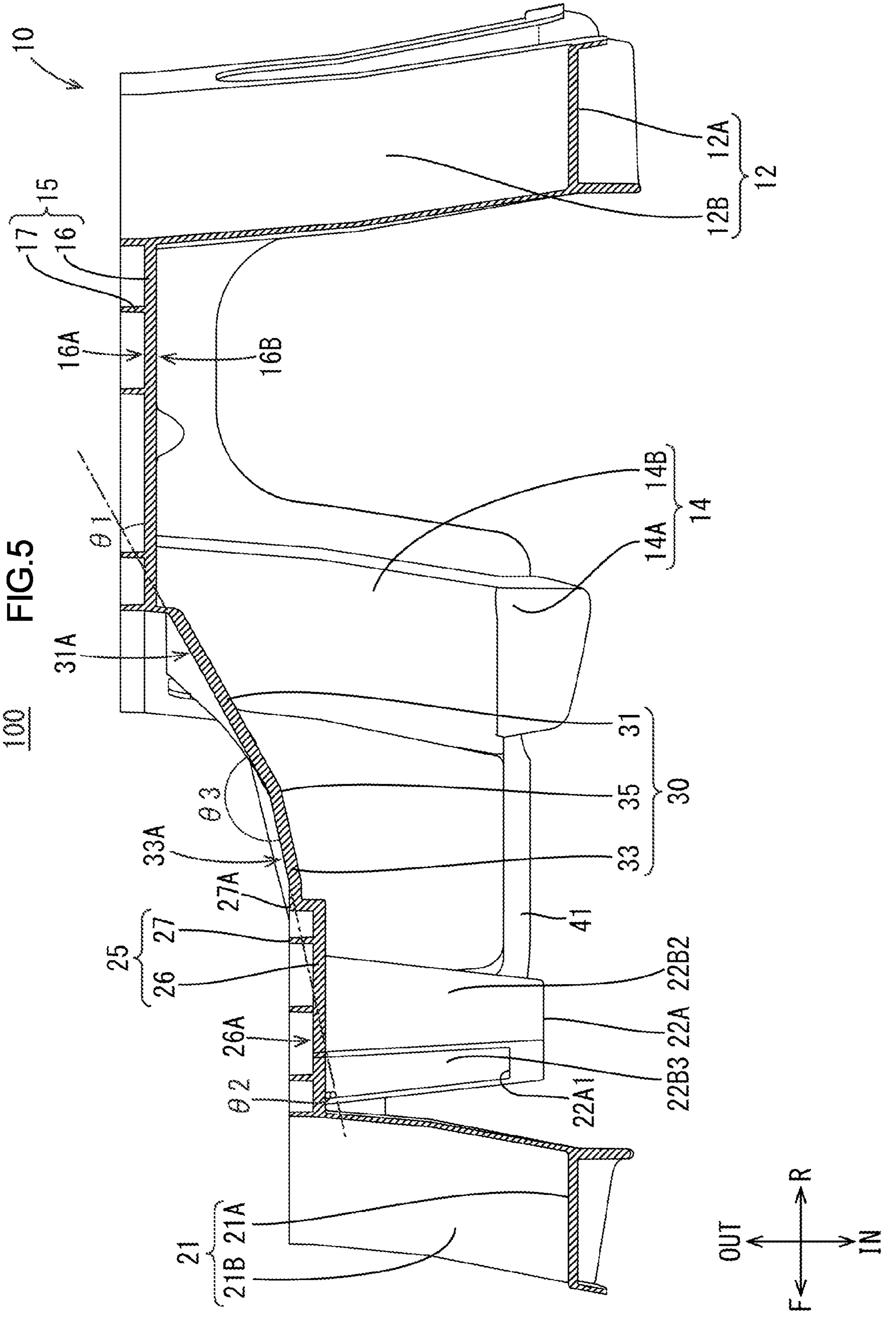
FIG. 5 is a cross-sectional view of the EA member taken along line V-V in FIG. 1.

As illustrated in FIGS. 4 and 5, the low rigidity plate portion 31 is continuous from the vehicular interior side surface 16B of the first body portion 16 of the first plate portion 15. The vehicular interior side surface 16B faces the vehicular interior side. The low rigidity plate portion 31 has a rectangular shape seen from the vehicular exterior side. The low rigidity plate portion 31 is sloped toward the vehicular interior side as it extends frontward from the first plate portion 15. The low rigidity plate portion 31 extends from the vehicular interior side surface 16B. The high rigidity plate portion 33 extends rearward from the second plate portion 25. The high rigidity plate portion 33 extends rearward from a frame rib 27A of the ribs 27 included in the second plate portion 25. The frame rib 27A projects toward the vehicular exterior side from a peripheral edge of the second body portion 26. The high rigidity plate portion 33 has a rectangular shape seen from the vehicular exterior side. The low rigidity plate portion 31 and the high rigidity plate portion 33 are joined together at the border section 35. The high rigidity plate portion 33 is sloped toward the vehicular interior side as it extends frontward from the border section 35. The high rigidity plate portion 33 is smaller than the low rigidity plate portion 31. Namely, the area of the vehicular exterior side surface of the high rigidity plate portion 33 is smaller than the area of the low rigidity plate portion 31. As illustrated in FIG. 3, the border section 35 extends in the upper-bottom direction and is sloped toward the upper and vehicular interior side as it extends frontward.

The slope of the high rigidity plate portion 33 is gentler than that of the low rigidity plate portion 31. The inclination angles of the low rigidity plate portion 31 and the high rigidity plate portion 33 are described with reference to FIG. 5. The angle between an upper surface 31A of the low rigidity plate portion 31 and the first body portion 16 of the first plate portion 15 is defined as an angle $\theta 1$ and the angle between an upper surface 33A of the high rigidity plate portion 33 and the second body portion 26 of the second plate portion 25 is defined as an angle $\theta 2$. The angle $\theta 2$ is smaller than the angle $\theta 1$. The angle between the upper surface 31A of the low rigidity plate portion 31 and the upper surface 33A of the high rigidity plate portion 33 is defined as an angle $\theta 3$. The angle $\theta 3$ is smaller than 180 degrees.

The second connection portion 40 includes a first end that is close to the low rigidity portion 10 and a second end that is close to the high rigidity portion 20. As illustrated in FIGS. 2 and 3, the first end of the second connection portion 40 is continuous to the base 14A of the third fix portion 14 of the first mount portion 11 and the second end of the second connection portion 40 is continuous to the second body portion 26 of the second plate portion 25. The second connection portion 40 includes a first extending portion 41 and a second extending portion 42. The first extending portion 41 extends frontward from the base 14A of the third fix portion 14. The second extending portion 42 extends toward the vehicular exterior side from a front end of the first extending portion 41 to be connected to the second body portion 26. The first extending portion 41 extends from the first mount portion 11 toward the high rigidity portion 20 and the second extending portion 42 extends from the first extending portion 41 to the second plate portion 25. The second connection portion 40 is bent at a section between the first extending portion 41 and the second extending portion 42 and is an L-shaped member.

Next, effects of this embodiment will be described. The EA member 100 according to this embodiment is mounted on the vehicular exterior side of the door trim 1. The EA member 100 includes the low rigidity portion 10, the high rigidity portion 20 that has higher rigidity than the low rigidity portion 10, and the first connection portion 30 that is connected to the low rigidity portion 10 and the high rigidity portion 20. The low rigidity portion 10 includes the first mount portion 11 and the first plate portion 15. The low rigidity portion 10 is fixed to the door trim 1 via the first mount portion 11. The first plate portion 15 includes the surface 16A that faces the vehicular exterior side and is disposed on the vehicular exterior side with respect to the first mount portion 11. The high rigidity portion 20 includes the second mount portion 21 and the second plate portion 25. The high rigidity portion 20 is fixed to the door trim 1 via the second mount portion 21. The second plate portion 25 includes the surface 26A that faces the vehicular exterior side and is disposed on the vehicular exterior side with respect to the second mount portion 21. The first connection portion 30 extends from the first plate portion 15 to the second plate portion 25 and connects the first plate portion 15 and the second plate portion 25.

According to the EA member 100, the force applied to one of the first plate portion 15 and the second plate portion 25 from the vehicular exterior side can be transferred to the other one of the first plate portion 15 and the second plate portion 25 via the first connection portion 30 that extends to connect the first plate portion 15 and the second plate portion 25. Therefore, the portions of the first plate portion 15 and the second plate portion 25 that are connected to the first connection portion 30 are not necessary to have a particular configuration for transferring the applied force to the door trim 1 or a particular configuration to be mounted on the door trim 1. For example, the front upper portion 15A of the first plate portion 15, which is a portion of the first plate portion 15 close to the first connection portion 30, does not have a particular configuration for transferring the applied force to the door trim 1 and a particular configuration to be mounted on the door trim 1. This can simplify the configuration and reduce the number of mounting components, and a cost is reduced. Each of the portions of the door trim 1 having different load bearing properties can be protected by the low rigidity portion 10 or the high rigidity portion 20 according to the required load bearing properties. Further, the force applied to the EA member 100 due to the collision can be dispersed via the first connection portion 30. Thus, the shock can be effectively absorbed.

The EA member 100 further includes the second connection portion 40 that connects the low rigidity portion 10 and the high rigidity portion 20. One end of the second connection portion 40 is connected to the first mount portion 11 of the low rigidity portion 10.

According to the EA member 100, the rigidity of the first mount portion 11 that is connected to the second connection portion 40 is increased. Accordingly, the EA member 100 can be mounted on the door trim 1 more stably.

The first connection portion 30 includes the low rigidity plate portion 31 and the high rigidity plate portion 33 that is disposed closer to the high rigidity portion 20 than the low rigidity plate portion 31 is. The first connection portion 30 is a plate member that is bent at a border section between the low rigidity plate portion 31 and the high rigidity plate portion 33.

According to the EA member 100, if an excessive force is applied to the low rigidity portion 10, the high rigidity portion 20, or the first connection portion 30, the first connection portion 30 is deformed or broken at the border section 35, which is a bent portion, between the low rigidity plate portion 31 and the high rigidity plate portion 33. Thus, the shock can be absorbed.

The high rigidity portion 20 includes the third mount portion 22 that extends from the second plate portion 25 toward the vehicular interior side and is fixed to the door trim 1 via a mount structure different from that of the second mount portion 21.

According to the EA member 100, with the third mount portion 22 that extends from the second plate portion 25 toward the vehicular interior side being fixed to the door trim 1, the rigidity of the high rigidity portion 20 can be increased. The high rigidity portion 20 is fixed to the door trim 1 with the two mounting portions, which include the second mount portion 21 and the third mount portion 22, having different mounting structures. With such a configuration, after the EA member 100 is provisionally fixed to the door trim 1 with one of the two mounting portions, the EA member 100 can be finally fixed to the door trim 1 with the other one of the two mounting portions. Accordingly, the EA member 100 can be easily mounted on the door trim 1.

The low rigidity portion 10 is disposed corresponding to the hip H1 of the occupant H who is seated in the seat of a vehicle and on the vehicular exterior side with respect to the hip H1. The high rigidity portion 20 is disposed corresponding to the thigh H2 of the occupant H and on the vehicular exterior side with respect to the thigh H2.

According to the EA member 100, the shock that is applied to the protection targets such as the hip H1 and the thigh H2 of the occupant H that are required to have different load bearing properties can be effectively absorbed.

<Other Embodiments>

The technology described herein is not limited to the embodiments described above with reference to the drawings. The following embodiments may be included in the technical scope. The technology described herein may be modified within the technical qscope.

(1) Other than the above embodiment, one end of the second connection portion may be connected to the first plate portion and the other end of the second connection portion may be connected to the second mount portion. One end of the second connection portion may be connected to the first mount portion and the other end of the second connection portion may be connected to the second mount portion or the third mount portion.

(2) The first mount portion and the second mount portion may be fixed to the vehicular interior component with stopper fitting and the third mount portion may be fixed to the vehicular interior component with using bosses. One of the fix portions included in the first mount portion may be fixed to the vehicular interior component with stopper fitting and the other fix portions of the first mount portion, the second mount portion, and the third mount portion may be fixed to the vehicular interior component with using bosses. The mounting structure of the mount portions may be various types of mounting structures other than the stopper fitting and bosses.

(3) The third mount portion may include a rectangular base and four extending portions that extend from peripheral edges of the base and may be configured not to open frontward. The third mount portion may include a base and two extending portions that extend from front and rear edges, respectively, or extend from upper and lower edges, respectively, and may be configured to open upward and downward or open frontward and rearward.

(4) The lengths, shapes, and thicknesses of the ribs of the first plate portion and the ribs of the second plate portion may be altered as appropriate. Accordingly, the rigidity of the low rigidity portion and the high rigidity portion can be adjusted appropriately.

(5) The vehicular shock absorber of the above embodiments may not be necessarily included in an automobile but may be included in various kinds of vehicles. Examples of the vehicles may be vehicles running on the ground such as a train and an amusement vehicle, flying vehicles such as an airplane and a helicopter, and vehicles on and in the sea such as a ship, and a submarine.

The invention claimed is:

1. A vehicular shock absorber that is to be mounted on a vehicular exterior side with respect to a vehicular interior component, the vehicular shock absorber comprising:

a low rigidity portion including a first plate portion that has a first vehicular interior side surface facing a vehicular interior side, and a first mount portion that extends from the first vehicular interior side surface toward a vehicular interior side and is to be fixed to the vehicular interior component:

a high rigidity portion having rigidity higher than rigidity of the low rigidity portion, the high rigidity portion including a second plate portion that has a second vehicular interior side surface facing the vehicular interior side, and a second mount portion that extends from the second vehicular interior side surface toward the vehicular interior side and having a mounting structure to be fixed to the vehicular interior component; and a first connection portion extending between and connecting the first plate portion of the low rigidity portion and the second plate portion of the high rigidity portion, wherein, with respect to the vehicular interior side, the first connection portion is positioned so as not to extend inwardly beyond the mounting structure of the second mount portion.

2. The vehicular shock absorber according to claim 1 further comprising a second connection portion that connects the first mount portion of the low rigidity portion and the high rigidity portion.

3. The vehicular shock absorber according to claim 1, wherein the first connection portion includes a low rigidity plate portion and a high rigidity plate portion that is disposed closer to the high rigidity portion than the low rigidity plate portion is.

4. The vehicular shock absorber according to claim 1, wherein the high rigidity portion includes a third mount portion that extends from the second plate portion toward the vehicular interior side and is to be fixed to the vehicular interior component with a mounting structure that differs from that of the mounting structure of the second mount portion.

5. The vehicular shock absorber according to claim 1, wherein the vehicular interior component is a vehicular door trim, the low rigidity portion is disposed corresponding to and on the vehicular exterior side with respect to a hip of an occupant who is seated on a seat of a vehicle, and the high rigidity portion is disposed corresponding to and on the vehicular exterior side with respect to a thigh of the occupant.

6. The vehicular shock absorber according to claim 3, wherein the first connection portion is a plate member that is bent along a line between the low rigidity plate portion and the high rigidity plate portion.

7. The vehicular shock absorber according to claim 3, wherein the first connection portion is a plate member, the low rigidity plate portion extends from the first plate portion and the high rigidity plate portion extends from the second plate portion and the low rigidity plate portion and the high rigidity plate portion extend so as to be closer to each other, and extending ends of the low rigidity plate portion and the high rigidity plate portion are joined together to form the plate member.

8. The vehicular shock absorber according to claim 6, wherein the first connection portion is bent to protrude toward the vehicular interior side.

9. The vehicular shock absorber according to claim 2, wherein the second connection portion includes a first extending portion and a second extending portion, the first extending portion extends from the first mount portion toward the high rigidity portion, and the second extending portion extends from the first extending portion to the second plate portion.

10. The vehicular shock absorber according to claim 9, wherein the first mount portion includes a base and an extending portion, the extending portion extends from the first plate portion toward the vehicular interior side, the base is at an extending end of the extending portion, and the first extending portion of the second connection portion extends from the base to the second plate portion.

11. The vehicular shock absorber according to claim 4, wherein the first mount portion includes an extending end portion and a hole that is through the extending end portion and through which a projection of the vehicular interior component is to be inserted to fix the first mount portion to the vehicular interior component with welding, the high rigidity portion includes a third mount portion that extends from the second plate portion toward the vehicular interior side, and the third mount portion includes an extending end portion and a stopper hole that is through the extending end portion and in which a stopper projection of the vehicular interior component is to be fitted and to fix the third mount portion to the vehicular interior component with the stopper projection being stopped by a hole edge of the hole.

12. The vehicular shock absorber according to claim 1, wherein an extending length of the second mounting portion is smaller than an extending length of the first mounting portion.

13. The vehicular shock absorber according to claim 1, wherein an area of a vehicular exterior-side surface of the second plate portion is smaller than an area of a vehicular exterior-side surface of the first plate portion.

14. The vehicular shock absorber according to claim 1, wherein the low rigidity portion is disposed on a vehicular rear side with respect to the high rigidity portion.

15. The vehicular shock absorber according to claim 1, wherein the first connection portion is a plate member that extends in an extending direction and has a vehicular interior-side surface facing the vehicular interior side and a vehicular exterior-side surface facing the vehicular exterior side, the first connection portion is disposed such that the vehicular interior-side surface is opposite the vehicular interior component, and the first connection portion is bent at a middle with respect to the extending direction.

* * * * *